United States Patent

[11] 3,595,174

| [72] | Inventor | Robert J. Juve |
| | | Sterling Heights, Mich. |
| [21] | Appl. No. | 878,486 |
| [22] | Filed | Nov. 20, 1969 |
| [45] | Patented | July 27, 1971 |
| [73] | Assignee | Udylite Corporation |
| | | Warren, Mich. |

[54] SYNCHRONIZED TURNTABLE FOR A RECIPROCATING CONVEYOR
10 Claims, 11 Drawing Figs.

[52] U.S. Cl. .................................................. 104/99, 104/162, 198/33 AB
[51] Int. Cl. .................................................. B65g 25/10, B65g 47/24
[50] Field of Search .................................................. 104/37, 99, 162, 163; 198/33 AB, 107

[56] References Cited
UNITED STATES PATENTS

| Re. 24,072 | 10/1955 | Davis | 134/77 |
| 3,192,873 | 7/1965 | Tullis | 104/162 |
| 3,230,896 | 1/1966 | Grant | 104/96 |

Primary Examiner—Arthur L. La Point
Assistant Examiner—Robert Saifer
Attorneys—Peter F. Casella, Donald C. Studley, Richard P. Mueller and James F. Mudd ABSTRACT: A conveying apparatus comprising a rail on which a plurality of work carriers are movably mounted and are intermittently advanced therealong by means of a reciprocating pusher mechanism. The rail is formed with a gas as defined by two spaced rail sections, between the ends of which a turnaround transfer mechanism is positioned for receiving work carriers from one rail section and transferring them to the other rail section in a manner so as to effect a 180° rotation thereof. The operation of the turnaround transfer unit is achieved in response to and in synchronization with the movement of the reciprocating pusher mechanism.

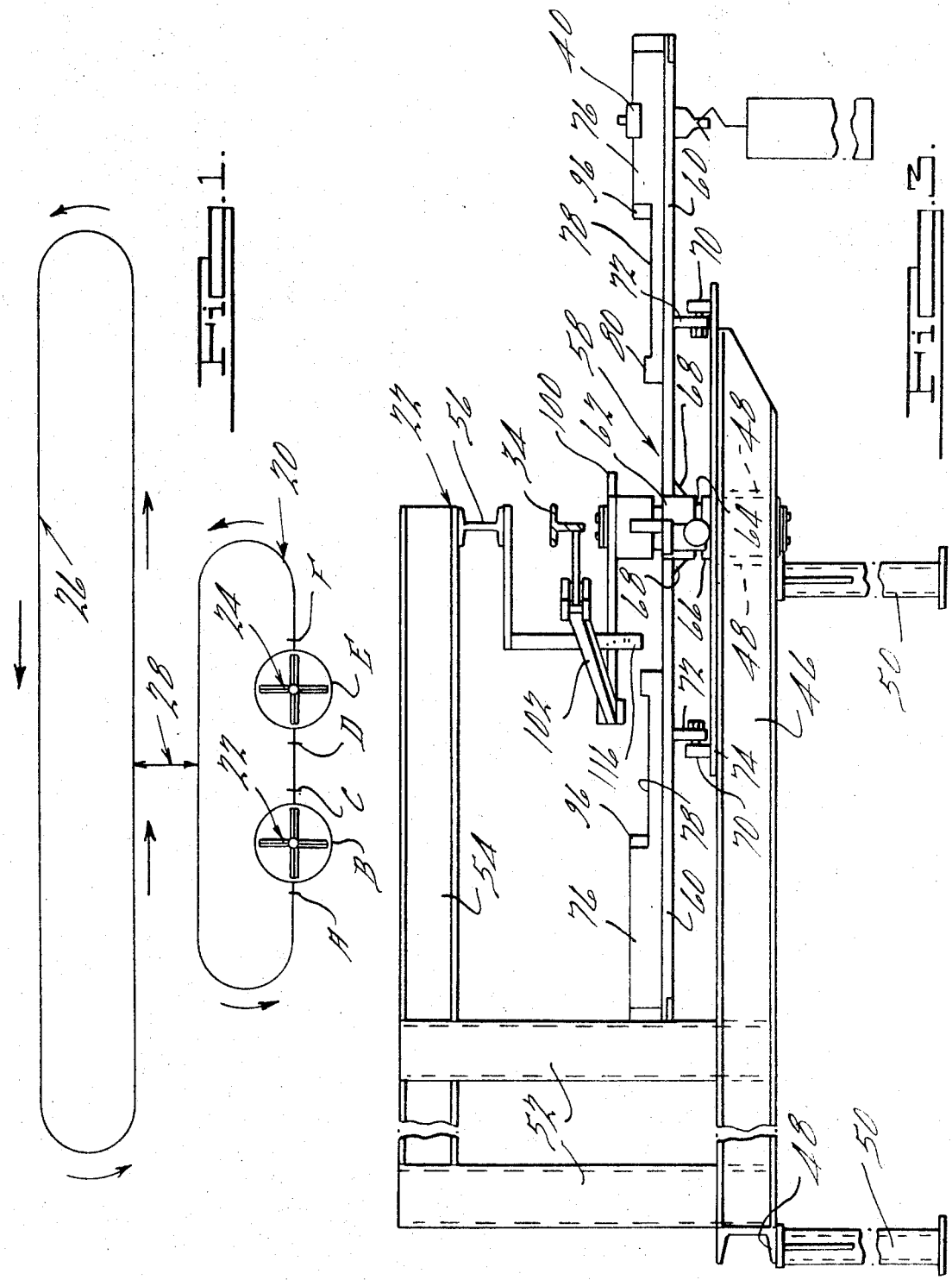

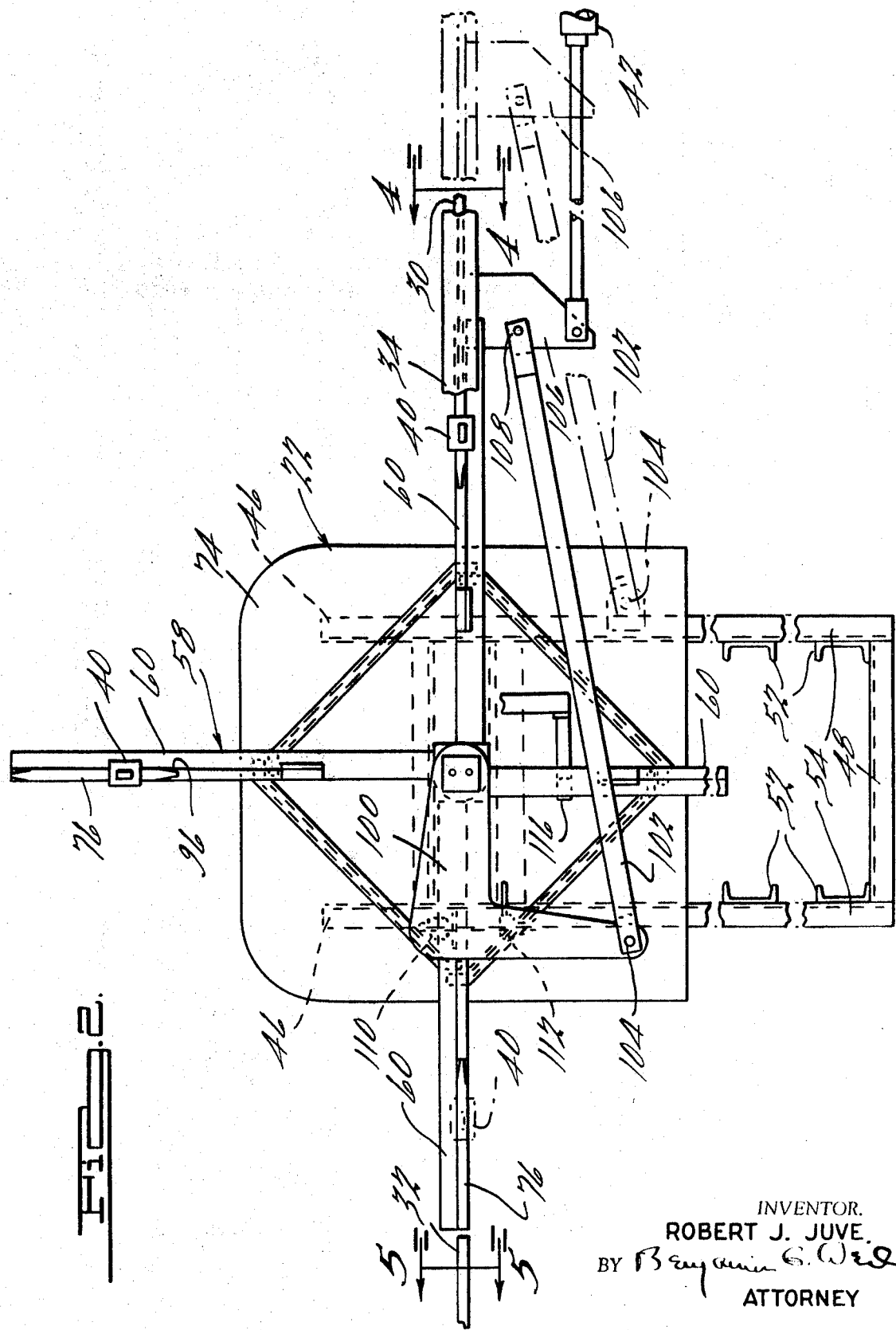

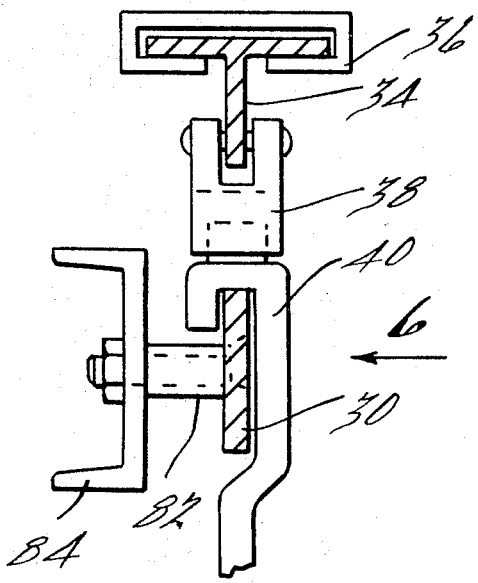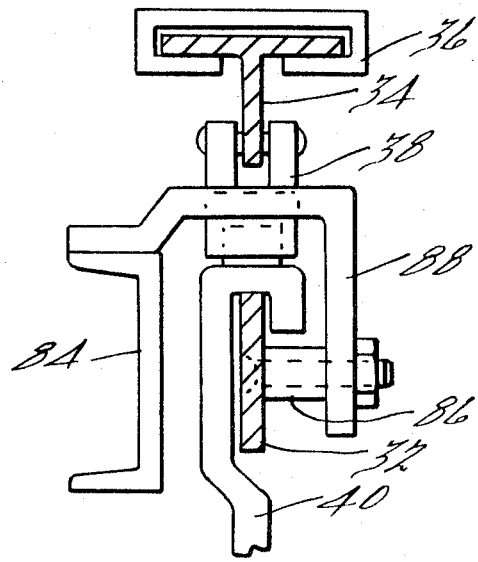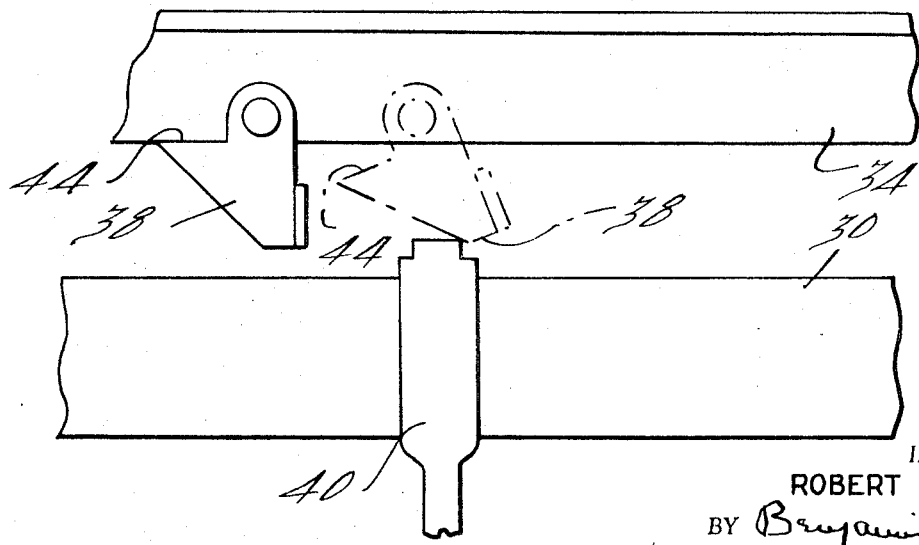

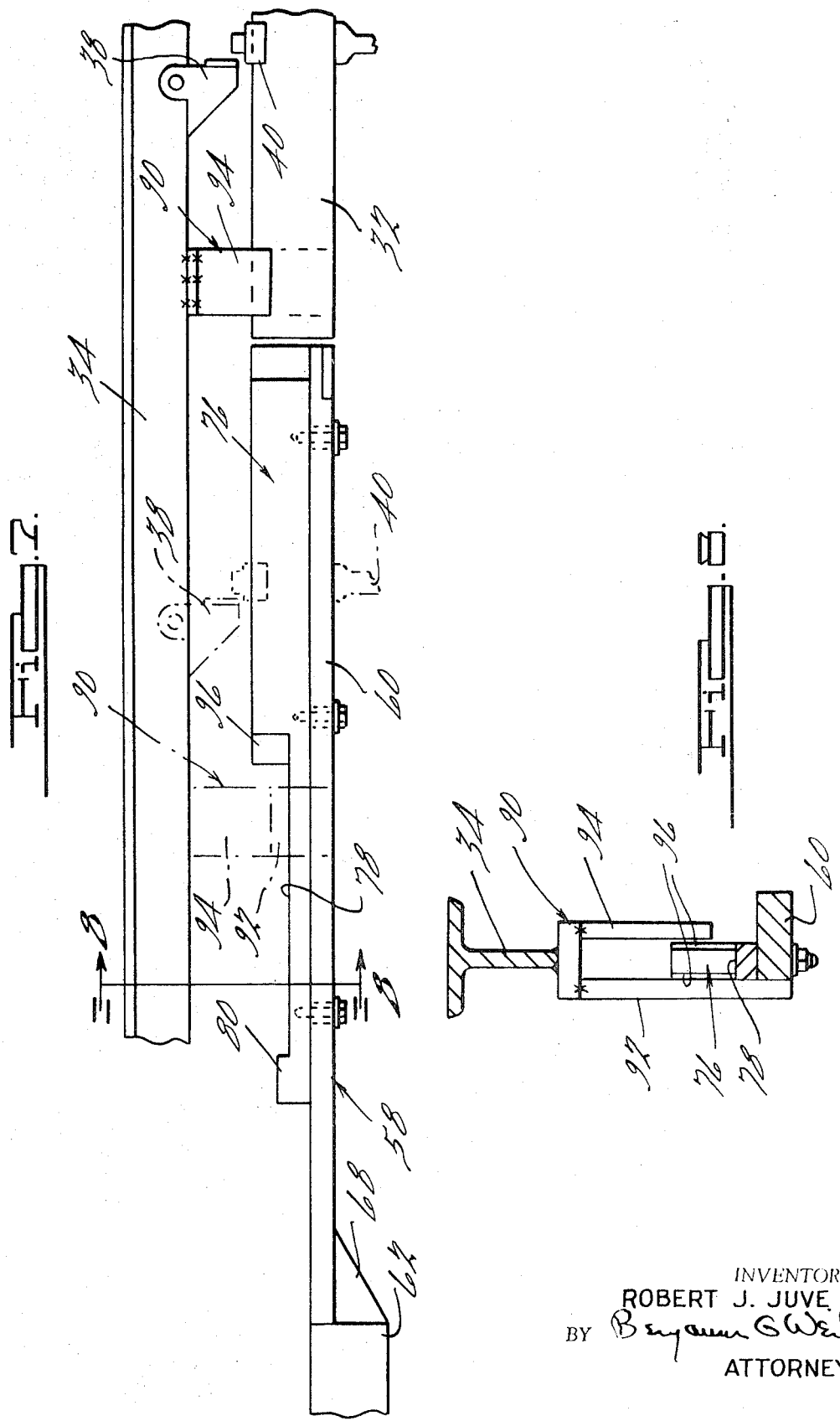

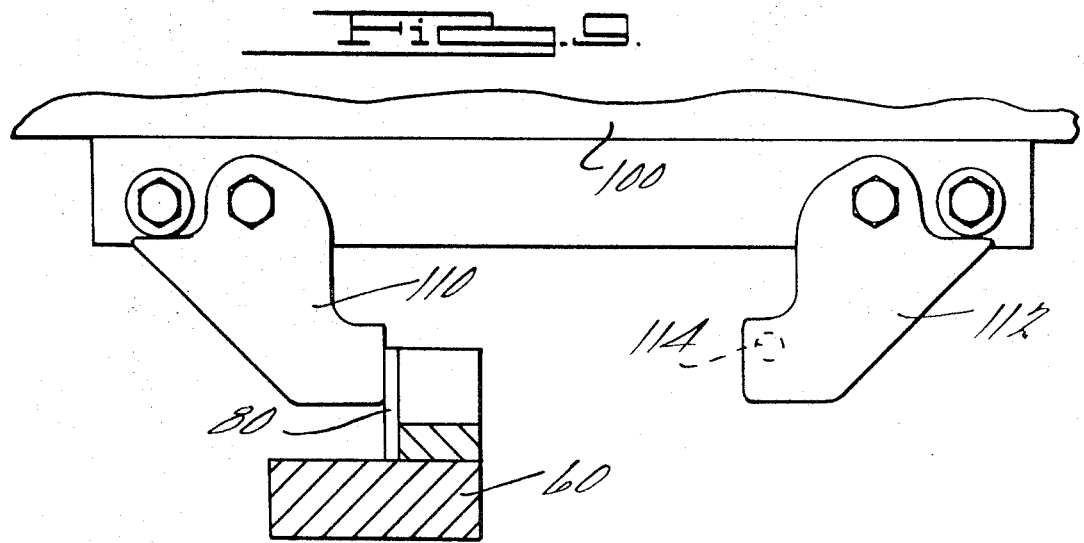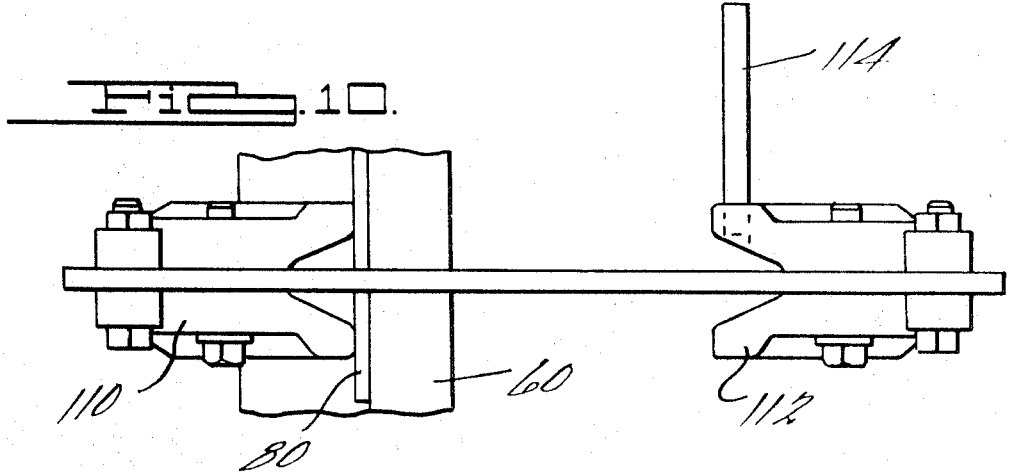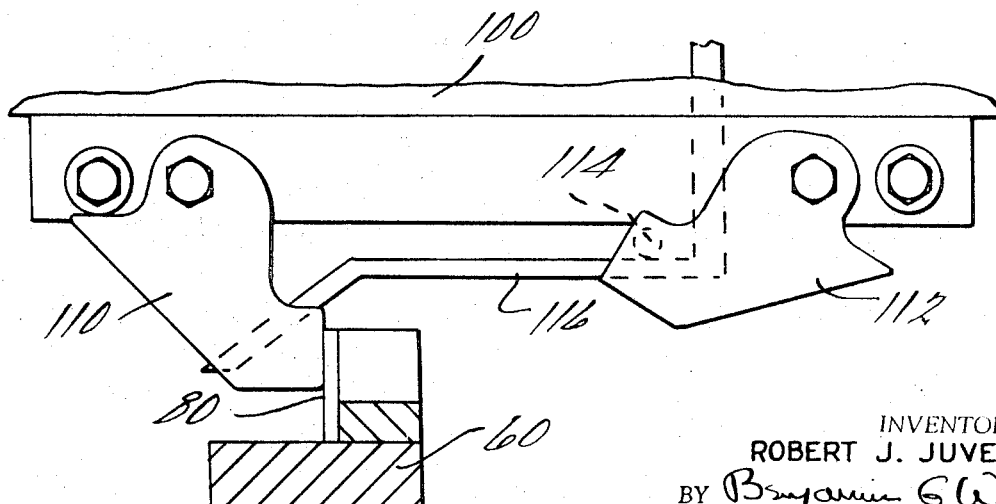

3,595,174

SYNCHRONIZED TURNTABLE FOR A RECIPROCATING CONVEYOR

BACKGROUND OF THE INVENTION

Automatic and semiautomatic conveying apparatuses and processing machines are in widespread use for sequentially transporting workpieces through a series of stations at which prescribed work operations and/or treatments are performed thereon. Conventionally, the individual workpieces are removably supported on work racks suspended from work carriers, which in turn are supported on rails that extend along the aligned series of work stations. In order to facilitate a loading and unloading of the workpieces from both sides of the work rack, it is frequently desirable to rotate the rack in a manner so as to render the workpieces accessible to the operators or automatic equipment at the load-unload station. It is also necessary in some processing arrangements to transfer work carriers from one machine to another machine and in so doing, a rotation of the work carriers must be performed in order to maintain them in appropriate engagement with the supporting rails.

In conveying machines of the types heretofore known incorporating rotary devices, it has been conventional to provide suitable control means for coordinating the movement of the rotary transfer device with the movement of the conveyor or processing machine to assure proper synchronization. The provision of separate drive mechanisms and the coordinating control systems has resulted in such machines being of relatively costly and complex construction and requiring careful service in order to assure satisfactory operation. Such prior art type transfer devices also employed structures which are relatively cumbersome and space-consuming, further detracting from their economy and efficiency.

The turn-around transfer mechanism of the apparatus comprising the present invention is of a compact and simple construction and operates in response to the operation of the principal transfer mechanism, thereby assuring a positive synchronization of the several conveying devices without necessitating separate control and drive systems.

SUMMARY OF THE INVENTION

The benefits and advantages of the present invention are achieved by a conveying apparatus including rail means on which a plurality of work carriers are disposed in spaced relationship and are intermittently advanced therealong by a reciprocating pusher mechanism. The rail means includes a first rail section and a second rail section spaced from the first section, between the ends of which a rotary transfer device is disposed for receiving work carriers from the first rail section, and effecting a transfer thereof and discharge to the second rail section while performing a rotation of the work carriers about their vertical axes. The transfer device comprises a plurality of circumferentially spaced rail segments which are rotatably mounted on a framework to which the work carriers are transferred from the first rail section and are rotatably indexed while on that rail segment to a position in which they are in alignment with and can be discharged to the input end of the second rail section. Intermittent indexing of the rotary transfer mechanism and the rail segments thereon is achieved by a drive mechanism operatively connected to the reciprocable transfer mechanism, whereby angular movement of the rotary transfer mechanism is achieved in response to the longitudinal reciprocatory travel of the pusher mechanism, assuring positive mechanical synchronization between the two units.

Other advantages and benefits of the present invention will become apparent upon a reading of the description of the preferred embodiments, taken in conjunction with the accompanying drawings.

BRIEF DESCRIPTION OF THE DRAWINGS

FIG. 1 is a schematic plan view of a typical conveying machine arrangement incorporating two turn-around transfer mechanisms of the present invention;

FIG. 2 is a plan view of a turn-around transfer mechanism shown in FIG. 1;

FIG. 3 is a side elevational view, partly in section, of the turn-around mechanism shown in FIG. 2;

FIG. 4 is a fragmentary vertical transverse sectional view taken through the supporting rail section of the conveyor at the input side of the transfer mechanism as shown in FIG. 2 and as taken substantially along the line 4—4 thereof;

FIG. 5 is a fragmentary vertical transverse sectional view through the supporting rail section of the conveying machine at the output side of the transfer mechanism as shown in FIG. 2 and as taken substantially along the line 5—5 thereof;

FIG. 6 is a fragmentary side elevational view of the work carrier and supporting rail section shown in FIG. 4 as viewed in the direction of the arrow indicated at 6;

FIG. 7 is a fragmentary side elevational view showing the disposition of an arm of the transfer mechanism relative to the work supporting rail at the discharge or output side of the transfer mechanism enabling transfer of a work carrier from the transfer mechanism to the supporting rail;

FIG. 8 is a transverse vertical sectional view showing the disposition of the combination stop and aligning mechanism relative to an arm of the transfer mechanism when the pusher mechanism is in the retracted position as shown in phantom in FIG. 7 and taken substantially along the line 8—8 thereof;

FIG. 9 is a fragmentary side elevational view of the pusher assembly on the transfer mechanism for effecting an indexing of the arms through a prescribed angular increment;

FIG. 10 is a fragmentary plan view of the pusher assembly shown in FIG. 9 with portions thereof broken away for clarity; and FIG. 11 is a fragmentary side elevational view illustrating a deactivation and tripping of one pusher of the pusher assembly by a cam mechanism when the reciprocating pusher mechanism is in the fully retracted position.

DESCRIPTION OF THE PREFERRED EMBODIMENTS

Referring now in detail to the drawings, and as may be best seen in FIG. 1, an arrangement typical of those in which the turn-around transfer mechanism comprising the present invention can be employed is illustrated in which two such transfer mechanisms are incorporated in a shop conveyor disposed adjacent to a principal conveying machine. As shown in FIG. 1, a shop conveyor, indicated at 20, includes a rail disposed in a closed loop arrangement, along one straight side of which two turn-around transfer mechanisms, indicated at 22 and 24, respectively, are positioned. A principal automatic conveying machine having a closed loop rail is schematically indicated at 26 to which work racks are transferred from the shop conveyor by means of a suitable lateral transfer device 28. The foregoing arrangement is typical of those in which the principal conveying machine 26 is employed for conveying work racks incorporating workpieces thereon through a series of treatments, such as encountered in an electroplating cycle, for example, whereafter the work racks are returned by the lateral transfer device 28 to the shop conveyor 20 in which the work racks are unloaded and reloaded with new workpieces to be processed.

In the specific arrangement illustrated in FIG. 1, the work carriers, including the work racks thereon, travel in a counterclockwise direction along the principal conveying machine and upon transfer by the lateral transfer device 28 to the shop conveyor rail, are conveyed to the input side of the turn-around transfer mechanism 22. In accordance with one arrangement, the exposed side of the work rack suspended on the work carrier, upon arriving at the station indicated at A, can be unloaded and thereafter, the work carrier is rotated through an angularity of 180° by the turn-around transfer mechanism 22 to a position at station C in which the other side of the work rack can be unloaded. Thereafter, the unloaded work rack can have the exposed side reloaded at station D and upon turn-around by the transfer mechanism 24, can finally be loaded at station F. At the completion of the reloading cycle, the fully reloaded work rack suspended from the work carrier can be transferred back to the principal conveying machine.

Alternatively, stations indicated at B and E of the turn-around transfer mechanisms 22 and 24, respectively, can be employed for effecting a concurrent unloading of the workpieces from both sides of the work rack and thereafter a reloading of both sides of the work rack with new workpieces to be processed. As previously mentioned, the necessity of employing such rotary transfer devices is also occasioned by the arrangement of the various rails and work stations so as to properly orient the engaging portion of the work carrier with the supporting rail to maintain appropriate alignment therebetween on passing from one machine or conveyor section to another processing machine and/or conveyor section.

Regardless of the specific functional objective of the turn-around transfer mechanism, the structural features and operating cycle is substantially identical in each instance. Accordingly, the description of the structural components and the cooperation thereof to effect a coordinated rotary transfer of work carriers in relation to one such transfer mechanism will suffice for providing a complete understanding of the structure and operation of other devices when employed in multiples of two or three, depending on the desired processing cycle and flexibility desired.

Referring now to FIGS. 2 and 3, a turn-around transfer mechanism 22 is shown which is positioned between the ends of a conveyor rail section 30, from which work carriers are transferred to the turn-around mechanism and a rail section 32 at the output side of the transfer mechanism to which the work carriers are discharged. Extending directly above and in longitudinal alignment with the rail sections 30, 32, is a longitudinally reciprocable pusher mechanism comprising a pusher bar 34 which is of a T-shaped cross section comprising a horizontal flange to which a vertical depending flange is integrally secured. The side edge portions of the horizontal flange, as best seen in FIGS. 4 and 5, is adapted to be slidably engaged at suitable spaced intervals in a guide shoe 36 affixed to the machine or conveyor framework. A series of pivotally mounted pushers 38 are pivotally secured at spaced intervals to the lower depending flange portion of the pusher bar and are adapted as shown in FIGS. 4—6 to engage the upstanding portion of a hook-shaped work carrier 40 slidably mounted on the supporting rail. Intermittent advancement of the work carrier and a work rack which is adapted to be suspended from the lower end portion thereof is achieved in response to the reciprocating movement of the pusher bar to and from a retracted position, such as shown in FIG. 6, in which the pusher is positioned behind the work carrier to an advanced position longitudinally spaced forwardly thereof. During the retracting movement of the pusher bar, the pusher, such as shown in phantom in FIG. 6, is adapted to pivot upwardly and over the next work carrier 40, enabling the pusher to become positioned rearwardly of the work carrier, as shown in solid lines in FIG. 6, preparatory to the next advancing stroke. Reciprocation of the pusher bar and the pivotally mounted pushers thereon to and from an advanced position and a retracted position is achieved by means of a double-acting fluid-actuated cylinder 42, such as shown in FIG. 2. It will be noted in FIG. 6 that the rearwardly projecting stop 44 of the pivotable pusher is adapted to engage the lower edge of the depending web of the pusher bar to prevent clockwise rotation thereof in response to engagement with a work carrier during the advancing movement of the pusher.

In accordance with the foregoing arrangement, the work carrier 40 and the work racks suspended therefrom are intermittently advanced along the several rail sections in appropriate spaced relationship in response to the advancing stroke of the reciprocable pusher mechanism. The structure and mechanically coordinated operation of the turn-around transfer mechanism 22 will now be described with particular reference to FIGS. 2 and 3. As shown, the rotary transfer mechanism comprises a framework comprising a pair of spaced channel members 46 which are interconnected by transverse channel members 48 forming a rectangular framework which is supported at an appropriate elevation and in a substantially horizontal position by means of a series of upright stanchions 50. The framework further includes an L-shaped superstructure comprising two pairs of vertical members 52, to the upper ends of which horizontal members 54 are secured which extend forwardly and are interconnected by a transversely extending I-beam 56 that is disposed directly above and in longitudinal alignment with the T-shaped pusher bar 34.

A rotor assembly 58, consisting of four radially extending arms 60 secured at their inner ends to a hub 62, is affixed to a shaft 64 journaled in a bearing 66 secured between the pair of transverse channel members 48 disposed substantially centrally below the pusher bar 34. Further rigidification of the rotor assembly 58 is provided by a series of triangular-shaped gussets 68 projecting radially of and integrally secured to the hub 62 as best seen in FIG. 3. Further horizontal support of each of the arms 60 is provided by a roller 70 rotatably mounted on a member 72 affixed to and depending from the lower side of each arm at a point intermediate the ends thereof. The roller 70 is disposed in rolling contact against a substantially rectangular bearing plate 74 supported on the upper surface of the channel members 46 of the transfer mechanism framework.

Each arm 60, as best seen in FIGS. 7 and 8, is provided with a stepped rail segment 76 affixed to the upper side thereof. The outer end or right-hand end of the rail segment 76, as viewed in FIG. 7, is of a height and width corresponding substantially to the rectangular cross-sectional configuration of the supporting rail section 32 to which the work carrier 40 is adapted to be transferred from the turn-around mechanism. Inwardly thereof, the rail segment 76 is provided with a rectangular notch 78 terminating adjacent to a square-shaped pusher pad portion 80 in a manner and for the purposes as subsequently to be described.

The transfer of work carriers to and from the rail segments 76 on the arms of the rotor assembly is achieved as previously indicated in response to the reciprocating travel of the principal pusher mechanism. For this purpose, and in accordance with the arrangement illustrated in FIGS. 2 and 4, a pusher 38 on the principal pusher bar is located so as to effect an advancement of a work carrier 40 from the rail section 30 to a position on the rail segment of the rotary transfer device when the arm and the rail segment thereof are disposed in longitudinal alignment with the end of the rail section 30. Similarly, a work carrier, as shown in phantom in FIG. 2, is adapted to be transferred by a pusher on the reciprocable pusher mechanism from a position on the rail segment 76 of the rotary transfer mechanism to the adjacent supporting rail section 32 when the arm and rail segment are disposed in alignment with the end of the rail section.

It will be noted when comparing FIGS. 4 and 5, that the work carrier 40 positioned on the rail section 30 overlies the outer surface of the rail such that the rail is supported by means of a series of brackets 82 affixed to a longitudinally extending channel member 84. The brackets 82 are secured to the rear surface of the rail 30 and are disposed at spaced intervals to provide the requisite support to the rail. In contrast, the rail section 32, as shown in FIG. 5, is supported by brackets 86 affixed at spaced intervals to the outer face surface of the rail section and are retained by L-shaped members 88 which are affixed to the longitudinally extending channel member 84. The disposition of the work carrier 40, as shown in FIG. 5, in which it overlies the inner or rear surface of the rail section 32, evidences a rotation of the work carrier through an angularity of about 180° about its vertical axis from the position shown in FIG. 4. This rotation is achieved in accordance with the rotation imparted by the turn-around transfer mechanism disposed between the two rail sections 30, 32. The reciprocable transfer mechanism is shown in FIGS. 2 and 7 in solid lines in the fully advanced position in which a completion of the transfer of work carriers has been accomplished, that is, a work carrier has been transferred to a position on the rail segment of the arm disposed adjacent to the rail section 30 while a work carrier has been transferred off the arm to a position on the rail section 32 at the opposite side of the transfer mechanism.

In order to assure that the rail segments on the arms are in appropriate longitudinal alignment with the ends of the rail sections of the conveyor machine, the reciprocable pusher mechanism, as best seen in FIG. 7, is provided with a combination guide and stop mechanism, indicated at 90, which is generally of an inverted U-shaped cross section comprising a long vertical leg 92 and a short vertical leg 94 which are disposed in spaced substantially parallel relationship and are adapted to overlie the vertical side surfaces of the raised end portion of the rail segment 76. The horizontal bight section of the guide and stop mechanism 90 is securely fastened to the lower edge of the depending web of the pusher bar as best seen in FIGS. 7 and 8. In its guiding function, the combination guide and stop mechanism is adapted to travel in accordance with the reciprocating travel of the pusher bar from a retracted position, as shown in phantom in FIG. 7, to a fully advanced position, as shown in solid lines, in which it is disposed in overlying sliding guided contact with the rail section 32. During the course of its reciprocating travel, the guide mechanism first effects engagement with the inner edge of the raised portion of the rail segment 76, assuring that the arm is disposed in appropriate longitudinal alignment with the axis of the pusher bar at a point before the pusher 38 effects a transfer of the work carrier 40 off the end of the rail segment into engagement with the rail section 32. For this purpose, it is preferred to provide the inner end of the raised portion of the rail segment 76 with a taper 96 as shown in FIGS. 7 and 8. It will be apparent from the foregoing that the overlying disposition of the depending legs 92, 94 of the combination guide and stop mechanism effects a guidance and alignment of the arms of the transfer mechanism with the ends of the rail sections 30 and 32 of the conveyor apparatus.

When the combination guide and stop mechanism 90 is in the fully retracted position, as shown in phantom in FIG. 7, the long depending leg 92 serves as a stop mechanism by overlying the side surface of the rail segment and arm preventing further rotation thereof in a counterclockwise direction as viewed in FIG. 2. Upon movement of the combination guide and stop mechanism to the fully advanced position, as shown in solid lines in FIG. 7, in which the leg 92 is disposed beyond the end portion of the arm 60, the rotor assembly 58 is free to rotate in a counterclockwise direction as viewed in FIG. 2. In accordance with the drive mechanism for the rotor assembly, as hereinafter to be described, indexing of the arms occurs at the beginning of the retracting movement such that the arm 60, as shown in FIG. 7, is indexed out of alignment with the rail section 32 at the time the combination guide and stop mechanism 90 moves to the left as viewed in FIG. 7 beyond the end of the rail section 32, enabling further unobstructed movement thereof to the fully retracted position, as shown in phantom, whereby the next arm 60 is able to rotate into aligned position with the rail 32 and with the side surface of the rail segment 76 thereof in abutting relationship with the inner side surface of the leg 92. It will be noted that the rectangular notch 78 provided in the rail segment enables the arm to be indexed to a position beyond the depending end portion of the leg 94, as viewed in FIG. 8, such that the arm is disposed in appropriate alignment with the combination guide and stop mechanism preparatory to the next advancing stroke of the principal pusher mechanism.

The indexing of the rotor assembly 58 through an angular increment of about 90° in response to the reciprocating travel of the principal pusher mechanism is achieved by a drive mechanism mechanically connected to the pusher bar, as may be best seen in FIGS. 2, 3 and 9—11. As shown in FIGS. 2 and 3, the drive mechanism comprises a bellcrank 100 which is secured at one end thereof to the upper end of the shaft 64 and to a drag link 102 by means of a pivot pin 104 at the other end thereof. The opposite end of the drag link 102, as shown in FIG. 2, is pivotally secured to an ear 106 affixed to and projecting laterally of the pusher bar 34 by means of a pin 108. In the exemplary arrangement illustrated, the double-acting fluid-actuated cylinder 42 is mounted with its rod end affixed to the ear 106 effecting reciprocation of the pusher bar through a prescribed longitudinal reciprocable stroke.

As best seen in FIGS. 2, 7 and 9, a pusher assembly comprising a pair of pivotally mounted opposed pushers 110 and 112 is affixed to the underside of the bellcrank 100. The pusher 110, as shown in FIG. 9, when the drive mechanism is in the position illustrated in FIG. 2 in solid lines, is adapted to be positioned behind and in pushing contact against the pusher pad portion 80 of the stepped rail segment. The pusher 112 is disposed with its engaging face in opposing spaced relationship from the arm 60 and serves to prevent any overtravel of the arm due to its momentum during the course of the indexing movement. As in the case of the pushers 38 on the reciprocable pusher mechanism and as previously described in connection with FIG. 6, the pusher 110 is pivotable from the normal engaging position, as shown in FIG. 9, to a pivoted inoperative position, as shown in phantom, to enable the pusher 110 to pass over the upper edge of the pusher pad portion 80 and thereafter drop down by gravity to the engaging position, as shown in solid lines. The pusher 112 similarly is pivotally mounted for pivoting movement in a clockwise direction, as viewed in FIG. 9, and is provided with a laterally extending engaging pin 114 which is adapted to engage a cam 116, as shown in FIG. 11, at the completion of the indexing movement of the drive mechanism, effecting a pivoting of the pusher 112 to an inoperative position in order that the abutting pushing face thereof will pass over the top edge of the pusher pad portion 80 during the next forward movement of the drive mechanism.

It will be apparent from the foregoing arrangement that during the retracting stroke of the pusher bar, the pusher 110 of the pusher assembly of the drive mechanism effects rotation of the rotor assembly 58 90° in a counterclockwise direction until the link arm attains the position as shown in phantom in FIG. 2 and the pushers assume the position as shown in FIG. 11. In that position, the pushing face of the pusher 110 remains in bearing contact against the pusher pad portion 80 of the arm, preventing inadvertent clockwise rotation of the rotor assembly while, as previously indicated, the leg 92, as best seen in FIG. 8, is disposed in bearing contact against the side surface of the next adjacent arm, preventing rotation of the rotor assembly in a counterclockwise direction. Accordingly, the stopping function of the leg 92 and pusher 110 prevents inadvertent drift of the rotor assembly during the dwell time period of the rotary transfer mechanism in the newly indexed position. In accordance with a preferred practice of the present invention, resiliently biased detents are provided in the ends of the arms which are adapted to coact with the ends of the rail sections 30, 32, facilitating alignment therebetween and further preventing inadvertent drift of the rotor assembly during the advancing movement of the pusher bar.

In operation, the cycle commences with the pusher bar in the fully retracted position and with the leg 92 (FIG. 8) and the pusher 110 (FIG. 9) retaining the rotor assembly in appropriate angular disposition such that opposed arms are disposed in alignment with the ends of rail sections 30 and 32, respectively, Thereafter, the transfer cylinder 42 is energized and the pusher bar 34 commences its advancing movement, whereby a work carrier is transferred from the rail section 30 to a position approximately midway along the stepped rail segment 76 of the adjacent arm while simultaneously a work carrier is transferred off the opposite arm to a position on the input end of the rail section 32. During this movement, the combination guide and stop mechanism 90 (FIG. 8) assures proper alignment between the rail segments and rail sections. At the same time, the bellcrank 100 is indexed to the position shown in solid lines in FIG. 2, whereby the pusher 110 is advanced to a position behind the pusher pad portion 80 (FIG. 9) and the pusher 112 is released from the cam 116 (FIG. 11) and drops downwardly to a blocking position as shown in solid lines in FIG. 9. Upon the pusher mechanism attaining the fully advanced position, such as by the tripping of a suitable sensing device or limit switch, the transfer cylinder 42 is again actuated whereupon the pusher bar commences its retracting travel and the rotary transfer mechanism simultaneously is indexed through an angular increment of 90°. Upon attaining the fully retracted position, the pushers 38 on the principal pusher bar pivot and slide over the work carrier to a position therebehind (FIG. 6) preparatory to the next advancing stroke. Similarly, the pusher 112 of the turn-around transfer mechanism is cammed upwardly (FIG. 11) to a position in horizontal clearance relationship relative to the arm preparatory to the next return movement of the bellcrank and pusher assembly.

It will be appreciated that while the turn-around transfer mechanism as herein described incorporates four arms disposed at substantially 90° increments, satisfactory rotary transfer mechanisms can be used incorporating two or more arms with an appropriate modification to the drive mechanism to effect an indexing of the rotor assembly through the prescribed angular increment.

While it will be appreciated that the description of the preferred embodiments of the present invention are well calculated to provide the advantages and benefits as hereinbefore set forth, the invention is susceptible to modification, variation and change without departing from the spirit of the invention as set forth in the subjoined claims.

What I claim is:

1. A conveying machine comprising rail means for movably supporting work carriers including a first rail section and a second rail section spaced from said first section, a transfer device for transferring work carriers from said first section to said second section, and reciprocating pusher means for intermittently advancing work carriers along said rail sections and to and from said transfer device, said transfer device including a framework, a plurality of circumferentially spaced rail segments rotatably mounted on said framework, drive means operatively connected to said pusher means for intermittently indexing said rail segments through an angular increment from a first position for receiving a work carrier from said first rail section to a second position for discharging a work carrier to said second rail section in response to the reciprocating movement of said pusher means.

2. The conveying machine as defined in claim 1, wherein the indexing of said rail segments from said first position to said second position is accomplished in response to the retracting movement of said pusher means.

3. The conveying machine as defined in claim 1, further including coacting alignment means operable in response to at least a portion of the reciprocating travel of said pusher means for positioning the rail segments in appropriate alignment with said first and said second rail sections.

4. The conveying machine as defined in claim 1, further including coacting stop means for restricting undesired angular movement of the rail segments at the completion of the angular indexing thereof.

5. The conveying machine as defined in claim 1, wherein said rail segments are positioned in an arrangement so that one of said rail segments is disposed in alignment with said first rail section for receiving a work carrier therefrom while a second rail segment is positioned in alignment with said second rail section for discharging a work carrier thereto during the same advancing stroke of said pusher means.

6. The conveying machine as defined in claim 1, wherein said drive means includes a bellcrank and drag link arrangement for effecting angular indexing movement of said rail segments in response to the retracting travel of said pusher means.

7. The conveying machine as defined in claim 1, wherein said drive means includes a pair of pivotally mounted pushers adapted to engage said rail segments for effecting angular indexing thereof through a prescribed increment during the retracting travel of said pusher means.

8. The conveying machine as defined in claim 1, wherein said rail segments are individually mounted on radially extending arms connected to a central hub, said pusher means further including aligning means thereon longitudinally reciprocable with said pusher means and adapted to slidably engage at least one of said rail segments for aligning said rail segment with the longitudinal reciprocating axis of travel of said pusher means.

9. The conveying machine as defined in claim 8, wherein each of said rail segments is formed with a clearance portion therein to enable angular movement of said arms into engaged relationship with said aligning means.

10. The conveying machine as defined in claim 8, in which said arms further include engaging pads adapted to be engaged by pusher means on said drive means for effecting angular indexing movement of said rail segments between said first and said second position.